J. M. BOWEN.
SELF PROPELLED VEHICLE.
APPLICATION FILED JULY 9, 1919.
1,413,215.
Patented Apr. 18, 1922.
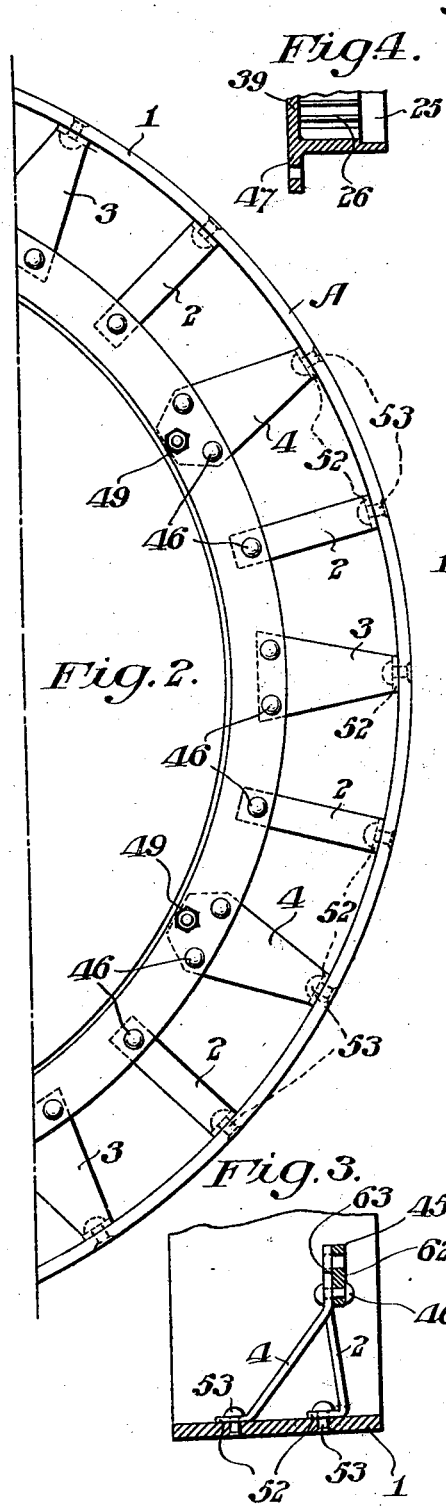
Fig. 2.
Fig. 4.
Fig. 3.
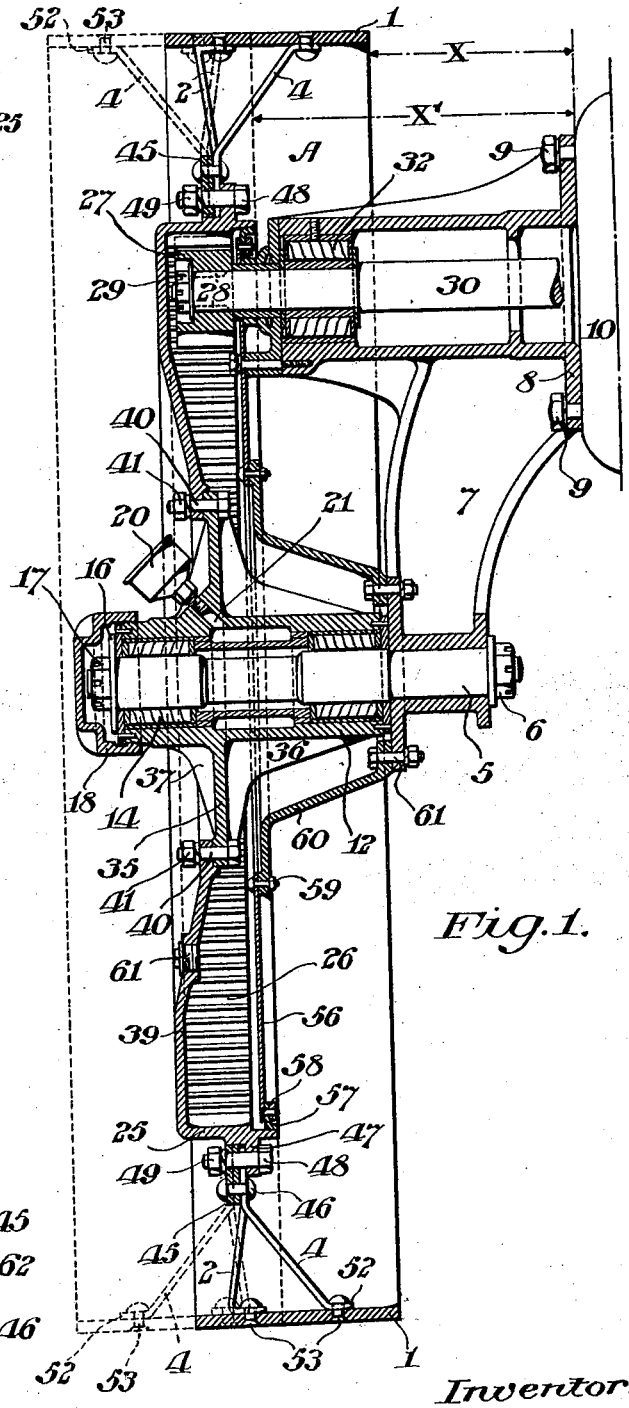
Fig. 1.
Inventor:
James Monroe Bowen,
By
Attorneys.

UNITED STATES PATENT OFFICE.

JAMES MONROE BOWEN, OF CAPE MAY COURT HOUSE, NEW JERSEY, ASSIGNOR TO S. L. ALLEN & CO., INC., A CORPORATION OF PENNSYLVANIA.

SELF-PROPELLED VEHICLE.

1,413,215.     Specification of Letters Patent.     Patented Apr. 18, 1922.

Application filed July 9, 1919. Serial No. 309,647.

*To all whom it may concern:*

Be it known that I, JAMES MONROE BOWEN, a citizen of the United States, and a resident of Cape May Court House, in the county of Cape May, State of New Jersey, have invented certain new and useful Improvements in Self-Propelled Vehicles, of which the following is a specification, reference being had to the accompanying drawing.

My invention relates more particularly to that class of self-propelled vehicles in which power is applied directly to the driving wheels in any suitable manner, and is especially applicable to self-propelled vehicles such as tractors utilized in farming and for other analogous purposes, in which it is frequently desirable to alter the width of the tread or distance between the wheels in order to secure the most satisfactory results from the operation of the machine.

A principal object of my invention, therefore, is to provide means whereby the tread or distance between the wheels of the vehicle may be readily increased or decreased as desired. Other objects of my invention are to provide means whereby the tread or distance between the wheels of a vehicle may be increased or diminished within limits without deranging, dismounting or otherwise altering the axles or other portions of the vehicle on which the wheels are operatively supported or the means whereby the power is supplied to the wheels, and to provide means adapted for this purpose which are extremely simple both in construction and in method of operation, and which may be readily understood and conveniently operated by persons who are not experienced mechanics without danger of injuring the parts or of erroneously assembling or disassembling them during the operation of varying the width of the tread.

My invention further includes all of the other various novel objects, advantages and features of construction and arrangement hereinafter more definitely specified and described.

In the accompanying drawing in which is illustrated a preferred embodiment of my invention in a form adapted for employment in a farm tractor, although it will, of course, be understood that the invention may be used with equal facility in other forms of self-propelled vehicles, Fig. 1 is a central vertical section of a wheel and its supporting members constructed in accordance therewith, the wheel being shown in full lines in one of the positions in which it may be adjusted for operation and in dotted lines in another of said positions; Fig. 2 is a fragmentary end elevation of a portion of the wheel and adjacent parts shown in Fig. 1; Fig. 3 a fragmentary central vertical section showing a detail of the invention, and Fig. 4 a fragmentary section of one of the elements slightly modified in construction from the corresponding element shown in Fig. 1.

The form of the invention shown in the drawing may comprise a suitable, preferably metallic, wheel A having a felly or rim 1 and peculiarly formed spokes 2, 3 and 4 hereinafter more particularly described. The wheel is operatively supported upon a suitable stationary stub axle 5 conveniently rigidly secured at its inner end as by a nut 6 to a depending bracket 7 preferably provided with a suitable flange 8 which may be conveniently secured, as by cap screws 9, to another suitable portion, such as the transmission housing 10, of the vehicle (not shown), the specific form of the bracket as well as the method of securing the same in position forming no part of my invention. Furthermore, it is to be understood that, if desired, the bracket in certain constructions may be modified in form or entirely omitted and the axle 5 supported in any other suitable and convenient manner.

A cylindrical hub 12 is rotatably supported upon the axle preferably on suitable anti-friction bearings, such as the roller bearings 14, which may be of any preferred construction, or, if desired, the anti-friction bearings may be entirely omitted and the hub arranged to rotate directly upon the axle. The hub preferably extends from a point adjacent the face of the bracket 7 to a point near the outer extremity of the axle and is prevented from longitudinal displacement thereon by any suitable means such, for example, as washer 16, secured in position by a nut 17 threaded on to the outer end of the axle which may for this purpose be conveniently reduced in diameter, a suitable hub cap 18 being provided and removably positioned on the outer extremity of the hub to enclose the nut 17 and adjacent parts and prevent the entrance of dust and dirt to the interior of the hub. A suitable grease cup 20 or other means of supplying lubricant to the bearings is preferably provided, by means of which the lubricant may be forced through a conveniently positioned passage 21 extending to the interior of the hub.

For the purpose of supplying motive power to the wheel to revolve the same and thereby propel the vehicle, suitable means are provided preferably comprising an internal gear secured in operative relation with the wheel and actuated by a pinion driven from any suitable source of motive power. In the form of the invention illustrated, the means employed for accomplishing this result comprise a large ring gear 25 having suitable teeth 26 on its inner periphery for engagement with a suitable pinion 27 rigidly secured in any convenient way, as by keys 28 and a castellated nut 29, to a drive shaft 30 supported in suitable, preferably anti-friction, bearings 32 positioned in a hollow outwardly extending portion of the bracket 7 through which the shaft is adapted to extend to connect with a suitable source of power, (not shown), by means of which the vehicle is propelled and which, as well as the means of supporting the shaft, form no part of the invention. The ring gear 25 consists of a metal shell and constitutes an intermediate section of the traction wheel.

For supporting the ring gear in operative unitarily movable relation with the hub 12, the latter is preferably provided with an outwardly extending circumferential flange 35 conveniently braced by integral webs 36, 37 and adapted to engage and overlap an inwardly extending flange 39 preferably integral with the ring gear and conveniently slightly dished toward its center as best shown in Fig. 1, a plurality of bolts 40 having nuts 41 and adapted to pass through suitable openings in the overlapping portions of the flanges serving to removably secure them in fixed operative engagement.

Means are provided for removably and reversibly securing the wheel A in operative relation with the ring gear 25 so that the latter, when actuated from shaft 30, will rotate the wheel, and while said means may be of any suitable form and construction, they may preferably comprise a supporting ring 45 rigidly secured to the inner end of the spokes 2, 3 and 4 in any convenient manner as, for example, by means of rivets 46, and means for removably and reversibly securing the ring in operative coaxial relation with the ring gear. Said means may preferably comprise an integral outwardly projecting circumferential flange formed on the exterior of the ring gear 25, the outer face of which is preferably machined to provide a suitable seat for the supporting ring 45 against which the latter, or under certain conditions, a portion of the spokes 4 are adapted to abut, both the flange and the supporting ring being provided with a plurality of registering apertures for the reception of bolts 48 carrying nuts 49 by means of which the ring may be secured in fixed operative relation on the flange. If desired, however, other suitable means for removably securing the flange in position may be employed.

The spokes 2, 3 and 4 may preferably be formed of sheet metal and provided at their outer extremities with suitable feet 52 adapted for the reception of rivets 53 or other convenient means for securing them rigidly to the felly, the inner ends of the spokes being also similarly rigidly secured to the supporting ring by rivets 46 or other convenient means. While the spokes may be of any desired shape, I prefer to make them substantially of the configuration shown in Fig. 2, that is, to make substantially one-half of the spokes with parallel sides and with their body portions extending substantially normal to the feet, these spokes being designated as 2, and to make the other spokes 3 and 4 with their body portions extending at an angle of about 45° to the feet and with diverging sides whereby both the strength of the spoke is increased and room obtained for the utilization of a plurality of rivets for securing each spoke to the supporting ring. While all of the spokes may be made of equal length so that they will overlap the supporting ring in equal amounts, I prefer to terminate the spokes 2 and 3 at a point on the supporting ring just outside of its line of contact with the flange 47, so that these spokes will never, under any conditions, engage the latter, and to carry the spokes 4, which conveniently may be every fourth spoke, inwardly for a sufficient distance to substantially completely overlie the ring as clearly shown in Fig. 2, the bolt apertures in the ring being continued through such overlying portion, so that when the wheel is assembled on the ring gear, as shown in full lines in Fig. 1, the spokes will contact with the flange 47 thereby maintaining the ring spaced from the flange for a distance equal to the thickness of the spokes. The several spokes are so positioned and secured to the felly 1 that they serve to support ring 45 in a plane considerably laterally offset from the plane equidistant from the sides of the felly, as clearly shown in Fig. 3, for a purpose hereinafter described.

For the purpose of enclosing the teeth on the ring gear 25 and pinion 36, and protecting the same from accumulations of dust and other foreign matter as well as for retaining lubricant within the ring gear, suitable means are provided which may conveniently comprise a circular plate 56 of sheet metal slightly less in diameter than the internal diameter of the open end of the ring gear, having a ring of felt or other suitable material 57 secured adjacent its periphery in such a way that the material will extend for a slight distance beyond the plate, a convenient method of securing the ring in position being to provide a metal ring or washer 58 of slightly less external diameter than plate 56 and rivet or otherwise secure it to the plate over the felt ring. The plate may be conveniently supported as by bolts 59 upon a dish-shaped flange 60 preferably removably supported, as by bolts 61, on the bracket 7, a suitable opening being provided in the plate for the passage of shaft 30. When the parts are assembled, plate 56 with its attached part is first mounted on the flange 60 and the ring gear then slid longitudinally into position, during the latter part of which movement its open end engages the ring 57 turning the latter outwardly to assume substantially the position shown in Fig. 1 thereby closing the opening between the periphery of plate 56 and the ring gear against the entrance of dust or other foreign matter, while leaving the latter free to revolve relatively to the plate. For conveniently introducing lubricant within the ring gear, a removable plug 61 may be positioned at a suitable point in flange 39.

It will, of course, be understood that while I have illustrated but a single wheel and its supporting members, the vehicle in practice will generally be provided on the opposite side with another wheel, preferably arranged and supported as hereinbefore described so that with both wheels assembled on their respective ring gears, as shown in full lines in Fig. 1, the tread or distance between the wheels will be determined by the construction, size and arrangement of the parts, and the distance from the inner edge of the felly to some fixed point of the vehicle, for example, to the point of junction of the bracket 7 with its supporting member, may be conveniently represented by the symbol X. If, now, it be desired to increase the width of the tread, this result may be readily brought about by removing the bolts 48, sliding the wheel A outwardly until free of the ring gear, the vehicle being, of course, conveniently supported on a jack or otherwise, reversing the wheel and reassembling it on the ring gear with the face 62 of the supporting ring in contact with the flange 47 instead of the overlying portions of the spokes 4 in contact therewith and again securing it in fixed operative relation with the ring gear by means of the bolts. With the parts assembled in this position, as shown in dotted lines in Fig. 1, the distance from the inner face of the felly to the fixed point to which the distance X was measured may be conveniently represented by the symbol X'; a distance increased over the distance X by an amount substantially equal to the distance from the plane equidistant from the sides of the felly to a plane midway between face 62 of the supporting ring and faces 63 of the overlying spokes.

The operations just described have, therefore, resulted in increasing the width of the tread of the vehicle by a corresponding amount, and it will of course be evident, that with the wheel initially assembled in the position shown in dotted lines in Fig. 1, the width of the tread may be similarly decreased by reversing the wheel to assume the position shown in full lines in said figure.

It will further be understood that, in practice, with the vehicle supplied with two or more wheels arranged on opposite sides thereof and preferably constructed substantially as hereinbefore described, both wheels may, if desired, be reversed substantially simultaneously in order to increase or decrease the width of the tread to the greatest possible extent or that only one wheel may be reversed thereby effecting an increase or decrease in the width of the tread equal to one-half of the maximum variation possible.

In Fig. 4 I have illustrated a slightly modified form of the invention in which the flange 47, instead of being positioned adjacent the open or inner side of the ring gear, is formed substantially as a continuation of the flange 39 adjacent the outside of the gear. With the parts so constructed it will be evident that the initial width of the tread of the vehicle will be increased by an amount equal to the distance through which flange 47 has been moved outwardly but that the operation of the invention will be similar in all respects to that of the preferred form to which I have referred at length. The flange 47 may also be positioned at any point intermediate of the positions shown in Figs. 1 and 4, a feature of considerable commercial importance since the several parts of the vehicle such as in the bracket 7, axles and the like, may thus be manufactured in a single standard size and by assembling them with ring gears having the flanges 47 suitably positioned thereon, a vehicle having a tread of any desired initial width, within the maximum and minimum limits permitted by the width of the ring gears, may be produced to meet the requirements of customers in different localities without modification of the standard parts of the machine.

While I have shown and described certain embodiments of my invention in forms suitable for employment in farm tractors or other substantially similar vehicles, I do not thereby intend or desire to limit myself solely to the employment of the invention in self-propelled vehicles of this nature, for the invention may be as readily employed in other forms of self-propelled vehicles, nor do I desire or intend to limit myself to the specific forms of the invention herein illustrated and particularly described, as numerous changes and modifications may be made in the details thereof as desired without departing from the spirit and scope of the invention, as defined in the appended claims.

Having thus described my invention, I claim and desire to protect by Letters Patent of the United States—

1. In a mechanism of the class described, the combination with a stationary supporting axle and driving means, of a traction wheel comprising a hub mounted on the axle and provided with an outwardly extending circumferential flange, an intermediate section consisting of an annular metal shell secured to the outwardly extending flange of the hub and provided with teeth and forming a ring gear to mesh with the driving means, a rim spaced from the intermediate section and angularly arranged spokes extending from the intermediate section to the rim and connecting the same.

2. In a mechanism of the class described, the combination with a stationary supporting axle and driving means, of a traction wheel comprising a hub mounted on the axle, an intermediate wheel section secured to the hub and provided with teeth forming a ring gear to mesh with the driving means, said intermediate wheel connection being provided at its outer portion with a circumferential flange, a rim spaced from the intermediate section, spokes arranged at intervals and secured at their outer ends to the rim and extending to the intermediate section, a supporting ring secured to and connecting the inner ends of the spokes and fitted on the intermediate section of the wheel and fastening devices securing the supporting ring to the said flange of the intermediate wheel section.

In witness whereof, I have hereunto set my hand this 8th day of July, A. D. 1919.

JAMES MONROE BOWEN.